(12) United States Patent
Bshara et al.

(10) Patent No.: US 10,740,466 B1
(45) Date of Patent: Aug. 11, 2020

(54) SECURING INTERFACES OF A COMPUTE NODE

(71) Applicant: Amazon Technologies, Inc., Seattle, WA (US)

(72) Inventors: Nafea Bshara, San Jose, CA (US); Matthew Shawn Wilson, Bainbridge Island, WA (US); Eric Jason Brandwine, Haymarket, VA (US); Anthony Nicholas Liguori, Bainbridge Island, WA (US); Yaniv Shapira, Bet Itzhak (IL); Mark Bradley Davis, Austin, TX (US); Adi Habusha, Moshav Alonei Abba (IL)

(73) Assignee: Amazon Technologies, Inc., Seattle, WA (US)

(*) Notice: Subject to any disclaimer, the term of this patent is extended or adjusted under 35 U.S.C. 154(b) by 112 days.

(21) Appl. No.: 15/280,897

(22) Filed: Sep. 29, 2016

(51) Int. Cl.
| | |
|---|---|
| *G06F 15/177* | (2006.01) |
| *G06F 21/57* | (2013.01) |
| *G06F 9/4401* | (2018.01) |
| *G06F 21/72* | (2013.01) |
| *H04L 9/06* | (2006.01) |

(52) U.S. Cl.
CPC .......... *G06F 21/575* (2013.01); *G06F 9/4406* (2013.01); *G06F 21/72* (2013.01); *H04L 9/065* (2013.01); *G06F 9/4401* (2013.01)

(58) Field of Classification Search
CPC .................................................. G06F 21/575
USPC .............................................................. 713/2
See application file for complete search history.

(56) References Cited

U.S. PATENT DOCUMENTS

| | | | |
|---|---|---|---|
| 6,799,272 | B1 | 9/2004 | Urata |
| 9,323,552 | B1 | 4/2016 | Adogla et al. |
| 9,798,482 | B1 | 10/2017 | Tsirkin et al. |
| 2006/0107320 | A1* | 5/2006 | Bhatt .................... G06F 21/575 |
| | | | 726/22 |
| 2009/0113217 | A1 | 4/2009 | Dolgunov et al. |
| 2009/0282266 | A1 | 11/2009 | Fries et al. |
| 2010/0153749 | A1 | 6/2010 | Sakai |
| 2010/0257331 | A1 | 10/2010 | Frank |
| 2011/0099387 | A1* | 4/2011 | Gremaud ............ G06F 12/1408 |
| | | | 713/190 |
| 2013/0166827 | A1 | 6/2013 | Cideciyan et al. |
| 2013/0205139 | A1* | 8/2013 | Walrath .................. G06F 21/72 |
| | | | 713/190 |

(Continued)

OTHER PUBLICATIONS

U.S. Appl. No. 15/445,190, filed Feb. 28, 2017, Titled: Efficient Memory Management in Multi-Tenant Virtualized Environment.

(Continued)

*Primary Examiner* — Volvick Derose
(74) *Attorney, Agent, or Firm* — Kilpatrick Townsend & Stockton LLP

(57) ABSTRACT

Interfaces of a compute node on a printed circuit board can be secured by obfuscating the information communicated over the interfaces. Data to be communicated between the compute node and a device on the printed circuit board using an interface can be encrypted, and an address corresponding to the data to be communicated can be scrambled. In addition, the compute node can be the root of trust which can provide secure boot of different components using an on-chip mechanism, and without relying on external devices.

24 Claims, 8 Drawing Sheets

(56) References Cited

U.S. PATENT DOCUMENTS

| | | |
|---|---|---|
| 2013/0326117 A1 | 12/2013 | Aune |
| 2014/0298338 A1 | 10/2014 | Doi |
| 2015/0113203 A1 | 4/2015 | Dancho et al. |
| 2015/0229471 A1* | 8/2015 | Nair .................... H04L 9/0822 713/171 |
| 2015/0242309 A1 | 8/2015 | Talagala et al. |
| 2015/0248357 A1 | 9/2015 | Kaplan et al. |
| 2016/0094552 A1* | 3/2016 | Durham ................ G06F 21/00 713/171 |
| 2016/0274814 A1 | 9/2016 | Zhang et al. |
| 2016/0292079 A1 | 10/2016 | Musoll |
| 2018/0095898 A1 | 4/2018 | Khosravi et al. |
| 2018/0150331 A1 | 5/2018 | Chen et al. |

OTHER PUBLICATIONS

U.S. Appl. No. 15/445,324, filed Feb. 28, 2017, Titled: Tracking Persistent Memory Usage.
U.S. Appl. No. 15/445,516, filed Feb. 28, 2017, Titled: Write Minimization for De-Allocated Memory.

\* cited by examiner

SECURING INTERFACES OF A COMPUTE NODE

BACKGROUND

One of the challenges in a compute platform is a potential risk of exposure of data being communicated on various interfaces of a compute node to unauthorized entities. As an example, interfaces of different devices on a printed circuit board (PCB) can be vulnerable to snooping due to the geometry of the printed circuit board, and the use of standard components. In some instances, connectors or cables used for connecting different components on a compute platform can be snooped. Snooping of the data or address being communicated on different interfaces on the PCB is a known threat. In some instances, customers' sensitive data stored in a memory on the PCB or coupled to the PCB can be monitored or stored using a snooping device, thus jeopardizing the confidentiality and integrity of the sensitive data.

BRIEF DESCRIPTION OF THE DRAWINGS

Various embodiments in accordance with the present disclosure will be described with reference to the drawings, in which.

DETAILED DESCRIPTION

Figure 1:
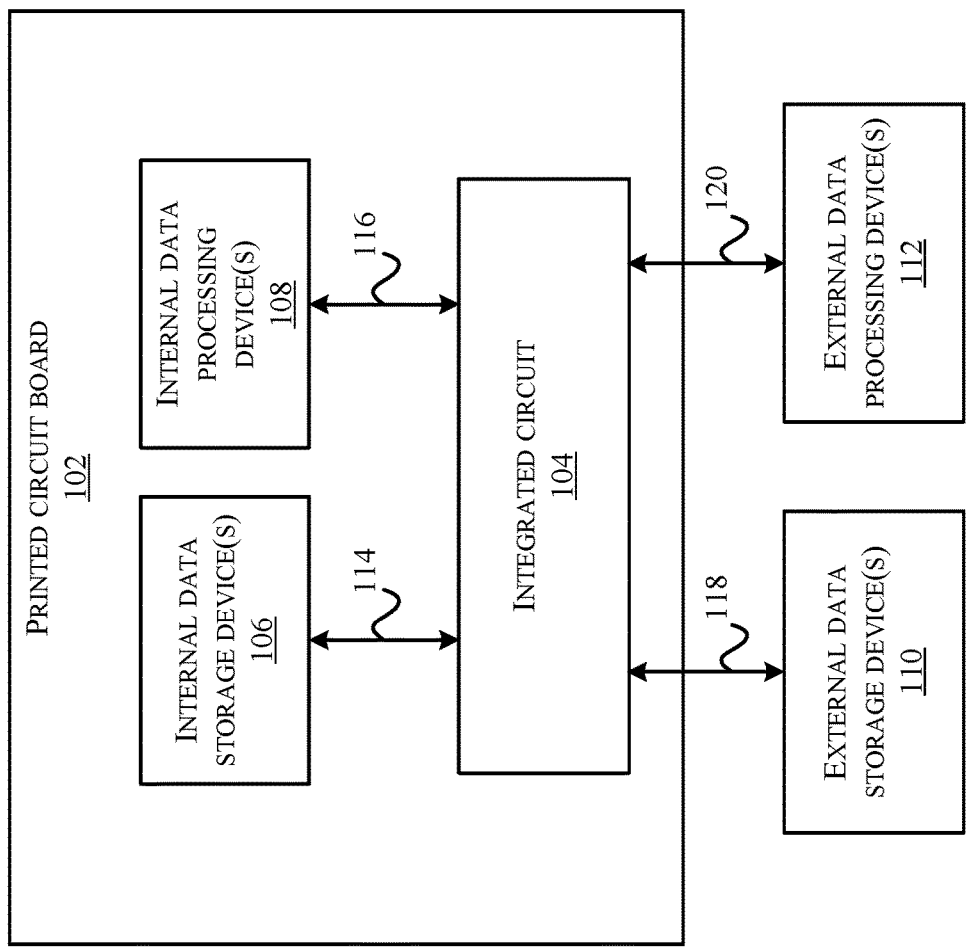
FIG. 1 illustrates an integrated circuit configured to communicate with a plurality of devices using encrypted interfaces, in one embodiment of the disclosed technologies.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In recent years, compute platforms have become more vulnerable to attacks with the use of various snooping mechanisms. For example, use of a memory (e.g., dual in-line memory module (DIMM)) with a battery backup to snoop or monitor various interfaces or physical hardware, especially in servers, is a known threat. The battery backup can store the data even after the server is powered down. In some instances, the snooped data can be transferred to a remote computer using a wireless modem. The geometry and the interfaces on a printed circuit board (PCB) can provide easy access for attaching a snooping device with or without a battery. For example, probes or scopes can be attached easily to monitor the data or address being communicated via different interfaces on the PCB. In addition, the rise in commercially available off-the-shelf analytic tools and components for server computers can make the compute platform more vulnerable to attacks via snooping of PCBs, connectors and local cables.

Especially in the high volume platforms where multiple standard components such as serial advanced technology attachment (SATA) drives, dynamic random access memories (DRAMs), peripheral component interconnect (PCI)/PCI express interfaces, network interface controllers, etc. are used, the hardware can be snooped easily since the protocols are well known and can be relatively easy accessible. In some instances, local cables or connectors (e.g., SATA cable, DRAM DIMM connector, PCI connector) used to connect different components on a compute platform may provide easy access to snooping devices. For example, the SATA bus or the PCI/PCIe interfaces can be snooped and the data can be transmitted remotely. In some instances, sensitive information such as customers' credit card numbers, social security numbers, or other confidential information can be tapped by snooping on address and data buses on a PCB. In some instances, data can be altered in transit by an unauthorized entity. This can compromise the confidentiality and integrity of the data causing loss of trust by the customers in addition to monetary losses.

In various embodiments of the disclosed technologies, interfaces of a compute node can be encrypted to obfuscate the information communicated between the compute node and other devices. The encryption may include encoding the interfaces using an encryption method such that only the intended recipient may be able to decode the interfaces using an appropriate decryption method. The compute node and the devices may be part of the same compute platform, e.g., a server computer. The compute node may be in the form of a processor, a system-on-chip (SoC), a field programmable gate array (FPGA), an application specific integrated circuit (ASIC) or any suitable circuit. The compute node may include processing logic and cryptographic logic, and may be configured to communicate with other devices, using buses, wires, connectors, cables, pins, pads, sockets, expansion slots, etc. In some implementations, the compute node can be surface-mounted on a printed circuit board (PCB) that may be part of the server computer. For example, the compute node may be in the form of an integrated circuit.

According to the embodiments, data to be communicated between the integrated circuit and a device can be encrypted, and the address for the data to be communicated between the integrated circuit and the device can be scrambled. For example, the data may include data to be written into the device or read from the device by the integrated circuit. The device may include a volatile memory (e.g., DRAM, SRAM, etc.) or a non-volatile memory (e.g., read-only memory, flash memory, storage device (e.g., hard disc drive, SSD, etc.). The address may correspond to a location in the device where the data has to be written to or read from. For example, the location may be associated with a memory address, or a register in the device. The encrypted data and the scrambled address can be provided to the device via a bus. The bus may include any bus suitable to carry data, and an address where the data is to be stored, or is read from, e.g., a memory address bus. The integrated circuit may be coupled to various devices, e.g., dynamic random access memory (DRAM), flash memory, boot memory, storage devices, (e.g., SATA drives, solid state drives (SSDs), hard disk drives), peripheral component interconnect (PCI)/PCI express devices, and other peripheral devices. In some implementations, the integrated circuit may be coupled to some of the devices that may be internal to the PCB, e.g., DRAM, boot read only memory (ROM), flash memory, various controllers, network interface card, graphics card, audio card, etc. For example, the devices may be soldered onto the PCB, or mounted using sockets, slots, etc. The integrated circuit may also be coupled to some devices that are external to the PCB, e.g., SSDs, hard disk drives, optical drives, etc., using local cables or connectors.

In embodiments of the disclosed technologies, the integrated circuit may be the root of trust (ROT) which can attest and authenticate without relying on external devices or interfaces. The ROT can provide verification of the software, data integrity and confidentiality, and data integrity attestation between other trusted devices on the PCB or coupled to the PCB. In some embodiments, the integrated circuit may include on-chip functionality similar to the trusted platform module (TPM). The TPM functionality may be part of the same silicon as the integrated circuit. In some embodiments, a valid boot image may be installed in an on-chip memory of the integrated circuit, which can be securely measured, or which can allow a secure boot of the integrated circuit without exposing any code to the external devices or interfaces of the integrated circuit. In some embodiments, the TPM functionality can be executed from an off-chip code that has been validated by an on-chip mechanism. The boot image may also be used to bootstrap the cryptographic logic on the integrated circuit and can be measured such that an external device can receive the measurement without relying on any external peripherals.

In some instances, the integrated circuit may be configured to exchange address and data with a data processing device, e.g., network interface controller (NIC), audio card, graphics card, etc. For example, the device may need to perform decryption and encryption of the data to process the data. The integrated circuit may need to establish trust with the device before exchanging data and address with the device. For example, in some embodiments, the integrated device may be configured to authenticate the device using asymmetric cryptography to establish trust between the integrated circuit and the device. The asymmetric cryptography, also known as public key cryptography, may utilize non-identical keys to authenticate each other. In some instances, one key, called the public key, can be shared with all the participants, and another key, called the private key, can be kept secret for each participant. In various embodiments, the trust between the integrated circuit and a device can be established using any known protocol, e.g., public key infrastructure (PKI), pretty good privacy (PGP), Open-PGP, secure sockets layer/transport layer security (SSL/TLS), key management service (KMS), etc. A certificate authority (CA) that may be trusted by the integrated circuit may be used to establish trust between the integrated circuit and the device. The CA may issue digital certificates that can include a public key and can certify the identity of an owner requesting the secure connection. The integrated circuit may be configured to determine a shared key using the asymmetric cryptography that may be used as a session key for communication between the integrated circuit and the device. One or more shared keys may be used for communication between the integrated circuit and the device. For example, a first shared key may be used for encryption and decryption of data for communication initiated by the integrated circuit, and a second shared key may be used for encryption and decryption of data for communication initiated by the device.

Once the trust has been established between the integrated circuit and a device using the asymmetric cryptography, the data to be communicated between the integrated circuit and the device may be encrypted and decrypted using symmetric cryptography, e.g., using advanced encryption standard (AES). The symmetric cryptography may be faster and may require fewer resources than the asymmetric cryptography and hence may be used for each session using the shared key. For example, the integrated circuit or the device may use the shared key or a key derived from the shared key to encrypt or decrypt the data. In some embodiments, multiple session keys may be derived from one shared key. For example, each session key may be a slight variation of the shared key that may be known to both the integrated circuit and the device. In some embodiments, the shared key may be derived using a symmetric key and the address bits.

In some embodiments, certain devices may consider the data opaque, e.g., certain devices may not alter the data or perform any functionality based on the data content. For example, certain data storage devices such as DRAMs, SSDs, flash memory, etc. may only store the data received from the integrated circuit without altering the data. The integrated circuit may encrypt the data for writing into a data storage device and may provide a scrambled address corresponding to the encrypted data to the data storage device. The data may be encrypted using symmetric cryptography. In most implementations, block level encryption may be used for encrypting the data for the data storage devices as it can allow reading and writing from random locations within the corresponding address space. In some embodiments, the address can be scrambled using a one-to-one mapping that may be performed using a scrambling function. For example, the one-to-one mapping may include mapping between each of a set of addresses for addressing the device and its corresponding scrambled address. The scrambling function used for the one-to-one mapping may include a random seed that can be selected before the storage devices is used, e.g., at boot time. In some embodiments, the random seed may be selected before a first write or read of the device. In some embodiments, scrambling may include encryption, e.g., address used for communicating with a device can be encrypted address. In various embodiments, the scrambling function may be different for different interfaces, devices, operating systems, etc. The data storage devices may store the encrypted data at a location corresponding to the scrambled address for write requests and may provide the stored encrypted data from the location corresponding to the scrambled address for read requests. The integrated circuit may read the stored encrypted data from the data storage device and decrypt the data using the symmetric encryption key or a key derived from the symmetric encryption key.

In various embodiments of the disclosed technologies, different interfaces of a compute node can be secured by obfuscating the information communicated between the compute node and other devices via one or more buses. Encrypting the data, and scrambling the address for the data, being communicated via the one or more buses, can render the data and addresses meaningless to a device snooping the buses. In addition, the integrated circuit being the root of trust can provide secure boot of the compute platform without relying on external devices, thus minimizing the risk of unauthorized access to the sensitive information.

FIG. 1 illustrates an integrated circuit configured to communicate with a plurality of devices using encrypted interfaces, in one embodiment of the disclosed technologies.

As illustrated in the figure, a compute platform 100 may include a printed circuit board (PCB) 102. For example, the compute platform 100 may be part of a server computer. The PCB 102 may include a platform to connect various electronic and mechanical components using conductive tracks, pads, etc. As illustrated in the figure, an integrated circuit 104 may be coupled to a plurality of devices on the PCB 102, e.g., internal data storage devices 106 and internal data processing devices 108. The integrated circuit 104 may also be coupled to a plurality of devices that are off the PCB 102 using cables or connectors, e.g., external data storage devices 110 and external data processing devices 112.

The integrated circuit 104 may be coupled to various devices using a plurality of different interfaces. However, for illustrative purposes, interfaces to the internal data storage devices 106 have been grouped as an interface 114, interfaces to the internal data processing devices 108 have been grouped as an interface 116, interfaces to the external data storage devices 110 have been grouped as an interface 118, and interfaces to the external data processing devices 112 have been grouped as an interface 120. An interface may provide a common connection between two electronic devices in order to communicate with each other using wires, cables, conductive tracks, pins, pads, sockets, slots, connectors, etc. In some embodiments, an interface may include a hardware interface which can be defined using mechanical, electrical or logical signals. The interface may include a parallel connection carrying multiple data bits simultaneously using multiple electrical connections, or a serial connection carrying one bit at a time using a single electrical connection. In the embodiments, an interface can be used to communicate data, address or control signals between devices via one or more buses, e.g., memory address buses. The buses may be configured to carry data, and an address for the data that may correspond to a location in the memory of a device where the data can be written to or read from. In some embodiments, the buses may include separate address and data buses. In some embodiments, the same bus can carry address or data. The address may include a set of address bits (e.g., 8, 16, 32, 64 bits) which may be used to identify certain memory locations in the device where the data can be written to or read from.

According to some embodiments, the interfaces 114, 116, 118 and 120 may be encrypted to obfuscate the information communicated between the integrated circuit 104 and the respective device. For example, the data to be communicated between the integrated circuit 104 and the respective device can be encrypted, and an address corresponding to the data to be communicated can be scrambled. In some implementations, the interfaces 114, 116, 118 and 120 may also be used to exchange control signals, e.g., read/write signals, chip select, etc. The interfaces 114, 116, 118 and 120 may include a parallel interface, or a serial interface. Each of the interfaces 114, 116, 118 and 120 may include a bus that is suitable to carry the encrypted data and the scrambled address, e.g., SATA bus, PCI/PCIe bus, system management bus (SMBus), inter-integrated circuit (I2C) bus, low pin count (LPC) bus, serial peripheral interface (SPI), etc.

The internal data storage devices 106 and the internal data processing devices 108 may include a plurality of devices that may be soldered onto the PCB 102, mounted on the PCB 102 using sockets or slots, or embedded in the substrate of the PCB 102, or may be on the PCB 102 using other suitable mechanisms. The internal data storage devices 106 may include devices that may use the data for storage purposes only. The internal data storage devices 106 may not consume the data for other purposes and hence may not parse or alter the data received from the integrated circuit 104. In some embodiments, the internal data storage devices 106 may store the encrypted data at a location corresponding to the scrambled address received over the interface 114 for a write request from the integrated device 104. The internal data storage devices 106 may also provide, over the interface 114, the encrypted data stored at a location corresponding to the scrambled address for a read request from the integrated device 104. For example, the internal data storage devices 106 may include volatile memory devices (e.g., DRAM, synchronous DRAM (SDRAM), asynchronous DRAM, DDR SDRAM, etc.), non-volatile memory devices (e.g., flash, read only memory (ROM), electrically erasable programmable read only memory (EEPROM), etc.), etc. The interface 114 may include a plurality of buses for different types of devices, e.g., memory address bus, low pin count (LPC) bus, serial peripheral interface (SPI), universal serial bus (USB), etc. The interface 114 may also utilize conductive tracks on the PCB 102, connectors, sockets, pins, slots, etc., that may be used to couple the internal data storage device 106 on the PCB 102. For example, a memory device may be soldered directly onto the PCB 102 or may be mounted on the PCB 102 using a socket.

The internal data processing devices 108 may include devices that can consume or process the data. The internal data processing devices 108 may be configured to decrypt, for further processing, the encrypted data received from the integrated circuit 104 over the interface 116. The internal data processing devices 108 may also be configured to encrypt the data for sending to the integrated circuit 104 over the interface 116. For example, the internal data processing devices 108 may include PCI/PCIe devices (e.g., network cards, audio cards, video cards, etc.), various controllers, power management devices, sensors, input/output (I/O) devices, etc. The interface 116 may include a plurality of buses for different types of devices, e.g., system management bus (SMBus), I2C bus, USB, PCI/PCIe bus, peripheral bus, etc. The interface 116 may also utilize conductive tracks on the PCB 102, connectors, sockets, pins, slots, etc., that may be used to couple the internal data processing devices 108 on the PCB 102. For example, a PCIe device may be mounted on the PCB 102 using a socket, and a power management controller chip may be soldered onto the PCB 102.

The external data storage devices 110 and the external data processing devices 112 may include a plurality of devices that may be external to the PCB 102. The external data storage devices 110 may be used for data storage purposes similar to the internal data storage device 106. The external data storage devices 110 may be coupled to the integrated circuit 104 via the interface 118, e.g., small computer system interface (SCSI), serial attached SCSI (SAS), etc., using wires, cables, connectors, etc. For example, the external data storage devices 110 may include mass storage devices, e.g., hard discs, optical devices, magnetic discs, etc.

The external data processing devices 112 may be configured to consume or process the data similar to the internal data processing device 108. The external data processing devices 112 may be configured to decrypt, for further processing, the encrypted data received from the integrated circuit 104 over the interface 120. The external data processing devices 112 may also be configured to encrypt the data for sending to the integrated circuit 104 over the interface 120. The external data processing devices 112 may be coupled to the integrated circuit 104 via the interface 120, e.g., SATA bus, SCSI, etc., using wires, cables, connectors, etc. For example, the external data processing devices 112 may include SATA drives, SSDs, or other peripheral devices.

According to some embodiments, the integrated circuit 104 may be configured to bootstrap using an on-chip mechanism. In some implementations, the integrated circuit 104 may serve as the root of trust (ROT) which can attest and authenticate without relying on other devices. The ROT can provide verification of the software, data integrity and confidentiality, and data integrity attestation between other trusted devices on the PCB 102. In some embodiments, the integrated circuit 104 may include certain on-chip functionality that may be similar to the trusted platform module (TPM). For example, the TPM functionality may be part of the same silicon as the integrated circuit 104. In some embodiments, a valid boot image may be installed in an on-chip RAM or an on-chip ROM on the integrated circuit 104, which can be securely measured, or which can allow a secure boot of the integrated circuit 104 without exposing any code to any of the devices or interfaces. In some embodiments, the TPM functionality can be executed from an off-chip code that has been validated by an on-chip mechanism.

In some instances, certain server computers may include more than one socket on the PCB to insert multiple processors to add additional processing power, e.g., Intel® Xeon, Itanium processors, etc. A point-to-point processor interconnect, e.g., Intel's Quick path interconnect (QPI), can be generally used to link two processors. Each processor may include multiple processing cores. According to some embodiments, the interface between each processor can also be encrypted to obfuscate the information to be communicated via the interface. For example, a first integrated circuit comprising a first processor may be inserted into a first socket and a second integrated circuit comprising a second processor may be inserted into a second socket. Each integrated circuit may be coupled to its own set of devices (e.g., memories, controllers, etc.). In some embodiments, each integrated circuit comprising a respective processor can be its own root of trust that can authenticate its components, and establish trust with the set of devices it may be configured to communicate with.

Figure 2:
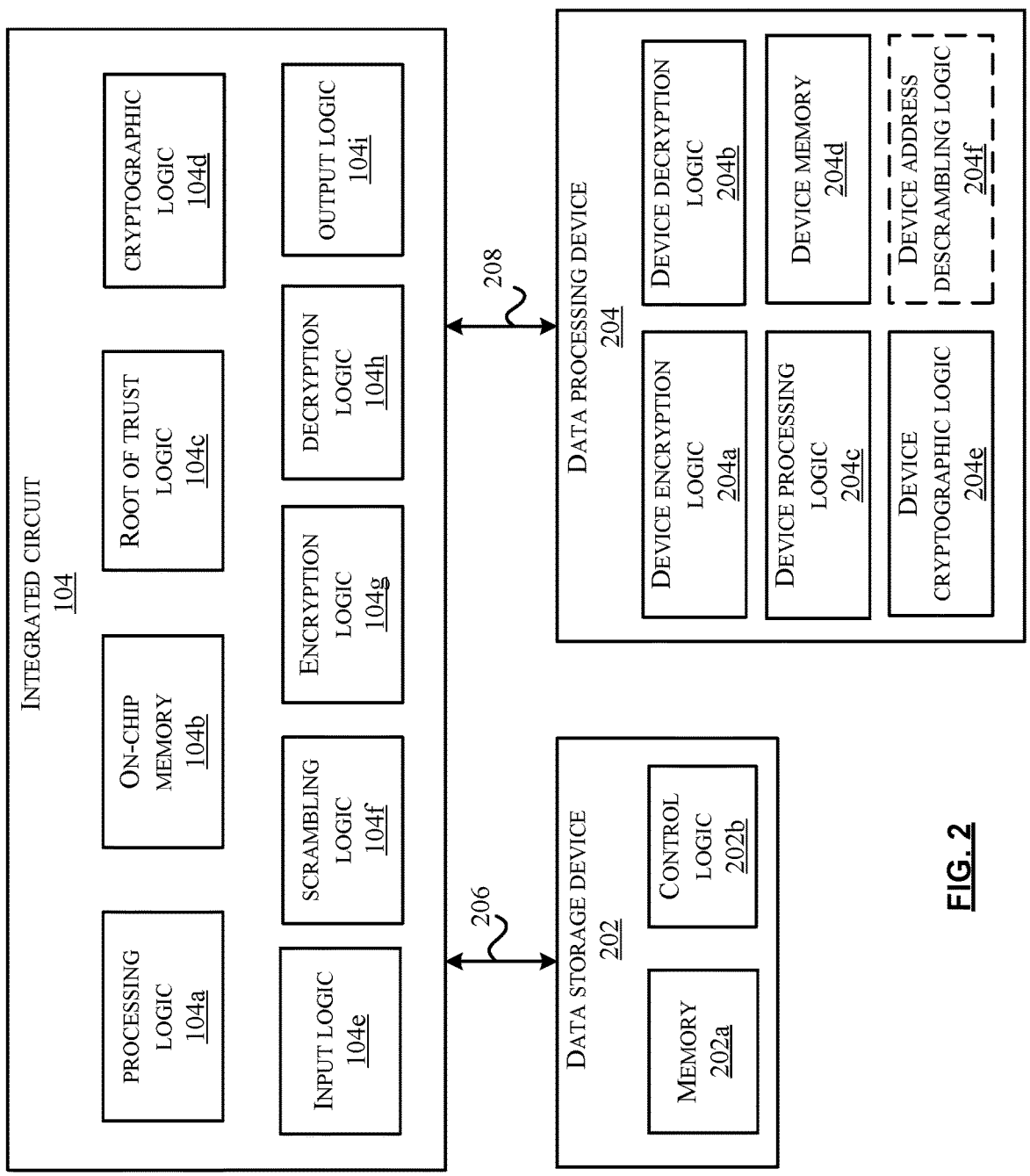
FIG. 2 illustrates a block diagram of the integrated circuit configured to communicate with a data storage device and a data processing device using encrypted interfaces, in one embodiment.

FIG. 2 illustrates a block diagram of the integrated circuit 104 configured to communicate with a data storage device and a data processing device using encrypted interfaces, in one embodiment. As illustrated in the figure, an apparatus 200 may include the integrated circuit 104 coupled to a data storage device 202 using an interface 206, and to a data processing device 204 using an interface 208. The interfaces 206 and 208 may include a memory address bus, e.g., SATA bus, SMBus, I2C bus, LPC bus, SPI bus, PCI/PCIe bus, etc., utilizing wires, connectors, conductive tracks, pins, sockets, slots, or any suitable interfaces. The data storage device 202 may be one of the internal data storage device 106 or the external data storage device 110, and the data processing device 204 may be one of the internal data processing devices 108 or the external data processing devices 112, as discussed with reference to FIG. 1.

In one implementation, the integrated circuit 104 may include processing logic 104a, an on-chip memory 104b, root of trust logic 104c, cryptographic logic 104d, input logic 104e, scrambling logic 104f, encryption logic 104g, encryption logic 104h, and output logic 104i. The integrated circuit 104 may be in the form of a processor, a system-on-chip (SoC), a field programmable gate array (FPGA), an application-specific integrated circuit (ASIC) or any suitable circuit.

The processing logic 104a may include one or more processing cores. The processing core(s) may be configured to execute a plurality of instructions stored on a computer-readable storage medium, e.g., in the form of a computer program. The computer-readable storage medium may be non-transitory. The computer readable medium may be part of the on-chip memory 104b or the data storage device 202. Some non-limiting examples of the processing cores may include ARM's cortex A57, MIPS, AMD Phenom, Intel ATOM, etc. In some embodiments, the processing logic 104a may be configured to execute a valid boot image stored in the on-chip memory 104b to perform bootstrapping without accessing the system memory (e.g., the data storage device 202).

The on-chip memory 104b may include an on-chip volatile or non-volatile memory (e.g., SRAM, flash, EEPROM, etc.). The on-chip memory 104b may be configured to store the BIOS (Basic Input/Output System) or a boot image that has been validated. In some implementations, the on-chip memory 104b may also store various keys, e.g., encryption keys, decryption keys, session keys or other cryptographic keys. In some implementations, the on-chip memory 104b may also store the random seeds used by the scrambling functions for scrambling and descrambling the address.

The root of trust logic 104c may be configured to provide an on-chip mechanism to bootstrap the integrated circuit 104. The bootstrapping can be referred to as a self-starting process that can proceed without any external input. The use of the on-chip mechanism to bootstrap the integrated circuit 104 without communicating with any external device can minimize the exposure of data to undesirable snooping mechanisms. In some embodiments, the root of trust logic 104c can be the root of trust which can perform authentication and attestation functionalities similar to a trusted platform module (TPM). For example, the root of trust logic 104c may perform a series of checks to confirm the integrity of various components. In some embodiments, the root of trust logic 104c may perform a secure boot or a measured boot to bootstrap various components of the integrated circuit 104. In some embodiments, the root of trust logic 104c may first measure the BIOS or the boot code before measuring other components. For example, the boot code may be stored in the on-chip memory 104b. In some implementations, the root of trust logic 104c can store the measurements in the on-chip memory 104b, which can be attested remotely to verify the boot state without relying on external peripherals or buses. In some embodiments, the root of trust logic 104c may be configured to measure the cryptographic logic on the integrated circuit 104. For example, the root of trust logic 104c may authenticate and attest the cryptographic keys used for encryption and decryption. Once the integrated circuit 104 has been authenticated and attested, the next level can be bootstrapped, e.g., the operating system.

In some embodiments, the cryptographic logic 104d may be configured to determine a cryptographic key at power-up or at any point in time before communication with a device starts using an encryption algorithm, e.g., advanced encryption standard (AES). The cryptographic key or a key derived from the cryptographic key can be used for encryption or decryption of data for data storage devices using symmetric cryptography, also known as symmetric-key cryptography. For example, the symmetric-key cryptography may utilize the same algorithm and the same key to encrypt or decrypt the data. In some embodiments, a key may be derived using the cryptographic key and the address bits. In one implementation, the cryptographic key may be stored in the on-chip memory 104b or in a register. In another implementation, the cryptographic key may be hardwired or burned in the silicon to prevent it from being tampered with. Providing the TPM functionality on the same silicon as the integrated circuit 104 can prevent unauthorized exposure of the keys on the buses or devices external to the integrated circuit 104. In some embodiments, the cryptographic key may be regenerated at boot time or reset. The cryptographic key may be valid for life of the data. For example, for encrypting and decrypting a first data, a first cryptographic key may be used, and for encrypting and decrypting a second data, a second cryptographic key may be used.

In some embodiments, the cryptographic logic 104d may also be configured to authenticate other devices coupled to the integrated system 104, using asymmetric cryptography. For example, a device, such as the data processing device 204, that can consume or process the data may need to decrypt the encrypted data received from integrated circuit 104 or may need to encrypt the data before sending to the integrated device 104. The asymmetric cryptography, also known as public key cryptography or asymmetric-key cryptography, may utilize asymmetric or non-identical keys to encrypt and decrypt data exchanged between the integrated circuit 104 and the device. In some instances, one key, called the public key, can be shared with all the participating devices, and another key, called the private key, can be kept secret for each participating device. The public key can be used for encryption and only an owner of the private key may be able to perform the decryption. In various embodiments, the trust between the integrated circuit 104 and a device can be established using any known protocol, e.g., public key infrastructure (PKI), pretty good privacy (PGP), OpenPGP, secure sockets layer/transport layer security (SSL/TLS), key management service (KMS), etc.

In some embodiments, a trusted certificate authority (CA) may be used to establish a secure connection between the integrated circuit 104 and the participating device. The CA may be a third party that may be trusted by the integrated circuit 104 and the participating device. For example, the cryptographic logic 104d may communicate with cryptographic logic in the participating device to establish trust between the integrated circuit 104 and the participating device, e.g., using the mutually trusted CA. The CA may issue digital certificates that can include a public key and can certify the identity of the owner requesting the secure connection. The integrated circuit 104 may receive the public key from the CA and may determine a shared key using the public key. The shared key may be used as a session key for communication between the integrated circuit 104 and the participating device using the symmetric cryptography, e.g., the AES. In some embodiments, the asymmetric cryptography may be used for transfer of a symmetric shared key between the integrated circuit 104 and the participating device, e.g., the data processing device 204. For example, the integrated system 104 may encrypt the shared key with the public key and send it to the participating device. The participating device can decrypt the shared key with its private key. The participating device can store the shared key and use the shared key or a key derived from the shared key for decrypting the data sent by the integrated circuit 104, or for encrypting the data sent to the integrated circuit 104. The integrated system 104 may decrypt, using the shared key or a key derived from the shared key, the encrypted data received from the participating device, which can be used for further processing. In some embodiments, the keys may be rotated. For example, the integrated circuit 104 may use a first cryptographic key to encrypt the data for writing to the data processing device 204. The data processing device 204 may use a second cryptographic key to encrypt the data for sending to the integrated circuit 104.

In some embodiments, a key derived from the shared key may be used as a session key for a communication session between the integrated circuit 104 and the participating device. For example, a key may be derived using the shared key and the address bits. In some embodiments, multiple session keys may be derived from the shared key based on a mutual agreement between the integrated circuit 104 and the participating device, which can be used for multiple sessions. As an example, a pre-determined variation can be applied to the shared key for each session that may be known to both end devices. In some implementations, the shared key or the key derived from the shared key may be stored in the on-chip memory 104b that may be used by the encryption logic 104g and the decryption logic 104h for encryption and decryption of data exchanged with the participating device.

In some embodiments, different shared keys may be generated for different participating devices. The integrated circuit 104 may establish trust with each participating device using a mutually agreed upon CA. For example, the integrated circuit 104 may determine a first shared key for communicating with an NIC after establishing trust with the NIC, and a second shared key for communicating with an SSD after establishing trust with the SSD. It will be understood that any cryptographic algorithm may be used to establish trust with other devices and to determine shared keys that can be used by both the integrated circuit and the participating devices for encryption and decryption of data.

The input logic 104e may be configured to receive encrypted data read from a device via a bus. For example, the input logic 104e may receive encrypted data from the data storage device 202 via the interface 206, or from the data processing device 204 via the interface 208. The input logic 104e may include a hardware interface to connect to other devices on or off the PCB 102. For example, the input logic 104e may be connected to the external devices using connectors, cables, wires, etc. The input logic 104e may be connected to the devices on the PCB 102 using conductive tracks, pins, connectors, sockets, etc. In some instances, the input logic 104e may receive control signals over the interface from the respective device. The input logic 104e may send the encrypted data to the decryption logic 104h for decryption.

The scrambling logic 104f may be configured to modify the address for the data to be written to a device coupled to the integrated circuit 104. The address may correspond to a memory location or a register in the device where the data is to be stored or read from. In some embodiments, the scrambling logic 104f may be configured to scramble the address using a scrambling function. In different embodiments, one or more address bits may be scrambled, e.g., with or without lower address bits. The scrambling function can perform a one-to-one mapping and may use a random seed to scramble the address bits. In some embodiments, the random seed may be selected at the boot time and may be stored in the on-chip memory 104b. In some embodiments, the random seed may be selected before a first write or read of the device. In some implementations, the one-to-one mapping may include mapping between each of a set of addresses for addressing the device and its corresponding scrambled address. As an example, the one-to-one mapping may include swapping different address bits using the random seed, e.g., swapping an address bit [0] with an address bit [5], swapping even address bits with odd address bits, etc. It will be noted that the scrambling of an address can be implemented at various levels. In some embodiments, more than one implementation can be used to scramble the addresses to provide an additional layer of obfuscation. For example, in some implementations, scrambling can be incorporated when mapping internal address space to the system memory address space using a liner function. In some embodiments, address space layout randomization (ASLR) may be implemented to randomly arrange address space positions for different processes when mapping to the system memory address space. Randomly placing the code can make the target address over the interface unpredictable, thus rendering it meaningless to a snooping device. In some implementations, address spaces between various devices can be randomized to provide another layer of obfuscation. The random function may be different for different devices, different operating systems, or may include other types of randomization. In some implementations, scrambling may include encryption of some or all of the address bits using a suitable encryption method. In some embodiments, the scrambling function and the random seed may be valid for the life of the data. For example, in order to maintain the correspondence between the data and the address, the same scrambling function can be used for the life of the data. In some embodiments, an address corresponding to the data to be written to a device may not be scrambled. For example, some devices may not support descrambling of the address, and hence may receive an unscrambled address from the integrated circuit 104.

The encryption logic 104g may be configured to perform encryption of the data to be written to a device coupled to the integrated circuit 104. For example, in one instance, the encryption logic 104g may use the cryptographic key or a key derived from the cryptographic key stored in the on-chip memory 104b for encrypting the data to be written to the data storage device 202 via the interface 206. In another instance, the encryption logic 104g may use the shared key generated by the cryptographic logic 104d to encrypt the data to be written to the data processing device 204 via the interface 208. The encryption logic 104g can perform stream encryption or block encryption for encrypting the data for different devices. For example, for certain devices (e.g., NIC), the encryption logic 104g can perform stream encryption by encrypting one byte of the data at a time. For certain devices (e.g., DRAM, flash), the encryption logic 104g can perform block encryption by encrypting a number of bytes as a block (e.g., 64 bytes) at a time. In some embodiments, XTS (xor-encrypt-xor based tweaked-codebook mode with ciphertext stealing) encryption may be used for block encryption.

The decryption logic 104h may be configured to perform decryption of the data read from a device coupled to the integrated circuit 104. For example, in one instance, the decryption logic 104h may receive encrypted data read from the data processing device 204 via the interface 208. The data processing device 204 may have encrypted the data using an encryption key that may be the same or different than the encryption key used by the integrated circuit 104. For example, the keys may be rotated between the integrated circuit 104 and the data processing device 204. In another instance, the decryption logic 104h may receive encrypted data read from the data storage device 202 via the interface 206. The decryption logic 104h may decrypt the received encrypted data using the shared key or a key derived from the shared key, as agreed upon by the respective devices. The decryption logic 104h may perform stream decryption or block decryption based on the type of encryption used by the data storage device 202 or the data processing device 204. The decrypted data may be used by the processing logic 104a for further processing.

The output logic 104i may be configured to communicate with a device coupled to the integrated circuit 104 using an interface of the integrated circuit 104. For example, the output logic 104i may communicate with the data storage device 202 via a first bus using the interface 206, and with the data processing device 204 via a second bus using the interface 208. For example, the integrated circuit 104 and the data storage device 202 may be configured to communicate using the first bus. The first bus may include a bus (e.g., SPI bus, I2C bus) configured to carry the encrypted data to be written in the data storage device 202, and a scrambled address corresponding to a location where the encrypted data is to be written. The output logic 104i may send the encrypted data for writing to the data storage device 202 at a location corresponding to the modified address using the second bus. For example, the integrated circuit 104 and the data processing device 204 may be configured to communicate using the second bus. The second bus may include a bus (e.g., PCI/PCIe bus, SATA bus) configured to carry the encrypted data to be written in the data processing device 204, and a scrambled address corresponding to a location where the encrypted data is to be written. The output logic 104i may send the encrypted data and the optional modified address to the data processing device 204 over the interface 208. The output logic 104i may be connected to the devices on the PCB 102 using conductive tracks, pins, connectors, sockets, etc. The output logic 104i may be connected to the devices off the PCB 102 using connectors, wires, cables, etc. In some implementations, functionalities of the input logic 104e and the output logic 104i may be combined for interfacing with different devices.

The data storage device 202 may include a memory 202a and control logic 202b. The memory 202a may include a volatile memory (e.g., SRAM, DRAM, SDRAM, DDR SDRAM, etc.), or a non-volatile memory (e.g., flash, ROM, EEPROM, etc.). The data storage device 202 may receive the encrypted data and the scrambled address over the interface 206 from the integrated circuit 104. The interface 206 may utilize any suitable bus that can carry data and address between the integrated circuit 104 and the data storage device 202. The data storage device 202 may be configured to store the encrypted data. The control logic 202b may be configured to determine a write or a read access to the memory 202a. For example, for a write request received from the integrated circuit 104, the control logic 202b may write the encrypted data in the memory 202a at a memory location corresponding to the scrambled address. For a read request received from the integrated circuit 104, the control logic 202b may read the encrypted data stored in the memory 202a at the memory location corresponding to the scrambled address and send the encrypted data to the integrated circuit 104 over the interface 206. Thus, the use of encrypted data and address to communicate with the data storage device 202 can minimize the risk of exposing the data and address to a snooping mechanism.

In some embodiments, the data storage device 202 may include a boot memory that can be used for bootstrapping the integrated circuit 104. The integrated circuit 104 may use the root or trust logic 104c to authenticate and attest using a valid boot image stored in the data storage device 202. In some other implementations, the boot code may be stored within the integrated circuit 104, e.g., in the on-chip memory 104b.

The data processing device 204 may include device encryption logic 204a, device decryption logic 204b, device processing logic 204c, a device memory 204d, device cryptographic logic 204e, and an optional device address descrambling logic 204f In some implementations, the data processing device 204 may be configured to process the data sent by the integrated circuit 104. For example, the data processing device 204 may include an NIC card, an audio card, a video card, or another PCI/PCIe device. In some implementations, the device memory 204f may include a volatile or a non-volatile memory, e.g., an SRAM, a DRAM, a register, a flash memory, ROM, or any suitable memory.

The device decryption logic 204b may be configured to decrypt the encrypted data sent by the integrated circuit 104 over the interface 208. The interface 208 may utilize any suitable bus that can carry data and address between the integrated circuit 104 and the data processing device 204. The device decryption logic 204b may use a shared key or a key derived from the shared key for decryption. The shared key may be stored in the device memory 204d. The device processing logic 204c may be configured to process the data, e.g., the data decrypted by the device decryption logic 204b. For example, the device processing logic 204c may process the data based on the functionality supported by the data processing device 204, e.g., networking, audio, video, storage, etc. In some instances, the processed data may be stored in the device memory 204d or sent to a remote computer over a network connection (not shown). The device encryption logic 204a may use a shared key or a key derived from the shared key for encryption of the data to be communicated to the integrated circuit 104 over the interface 208. For example, in some embodiments, the data processing device 204 may initiate communication with the integrated circuit 104 by sending encrypted data over the interface 208 to the integrated circuit 104.

The device cryptographic logic 204e may be configured to communicate with the cryptographic logic 104d to establish trust between the integrated circuit 104 and the data processing device 204, e.g., using a mutually trusted CA. In some implementations, the device cryptographic logic 204e and the cryptographic logic 104d may work with each other to mutually agree upon a shared key or a derivation of the shared key to be used for symmetric cryptography.

The optional device address descrambling logic 204e may be configured to descramble the address using a scrambling function. For example, the scrambling function may use the same random seed as the one used by the integrated circuit 104 for scrambling the address sent to the data processing device 204. In some implementations, the random seed may be pre-determined at the time of establishing the trust with the data processing device 204. The random seed may be stored in the device memory 204d. In some instances, the data processing device 204 may not support descrambling the address. For example, in some instances, the data processing device 204 may receive unscrambled address from the integrated circuit 104 which may not require descrambling. In some instances, the data processing device 204 may receive encrypted address bits and may decrypt the address bits using the same encryption method that was used to encrypt the address bits.

In some embodiments, the PCB 102 may include more than one integrated circuit that may be coupled to their respective set of devices. For example, in some instances, multiple integrated circuits can be mounted in different sockets on the PCB 102 to increase the processing power of a server computer. Each integrated circuit may include components similar to the integrated circuit 104, e.g., processing logic, cryptographic logic, on-chip memory, encryption and decryption logic, scrambling logic, etc. According to some embodiments, interface between different integrated circuits can be encrypted to secure the processor to processor link. In one implementation, each integrated circuit can include its own root of trust logic similar to the root of trust logic 104c that can be used to perform a secure boot of the respective integrated circuit. In another implementation, a central root of trust can be used to authenticate all the participating integrated circuits.

Figure 3:
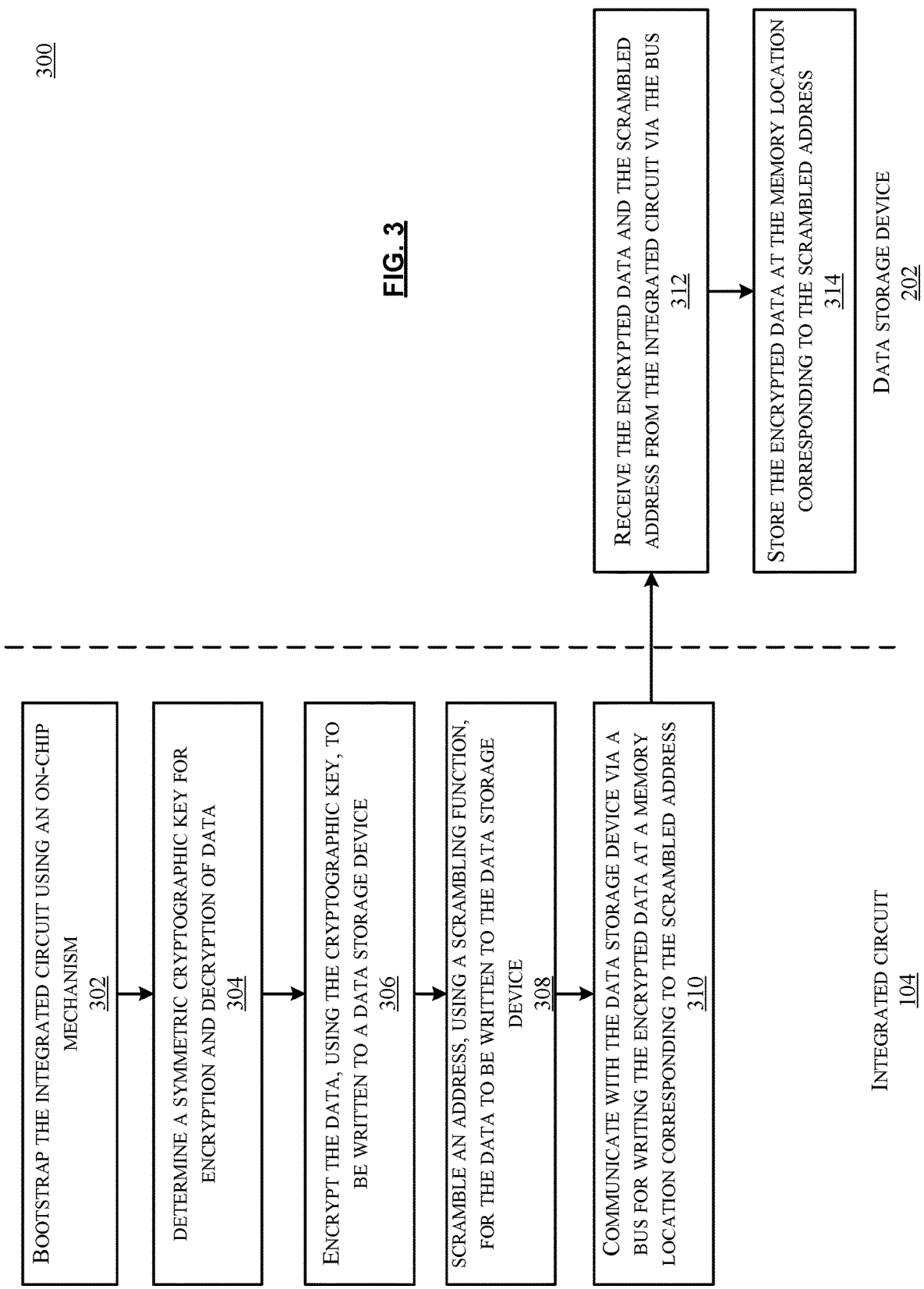
FIG. 3 illustrates communication between the integrated circuit and the data storage device, using encrypted interfaces for writing into the data storage device, in one embodiment.

FIG. 3 illustrates communication 300 between the integrated circuit 104 and the data storage device 202 using encrypted interfaces for writing into the data storage device 202, in one embodiment of the disclosed technologies. In this example, the data storage device 202 may include a volatile memory, e.g., a DRAM, an SDRAM, a DDR SDRAM, an SRAM, etc.

In step 302, the integrated circuit 104 can be bootstrapped, using an on-chip mechanism. For example, the integrated circuit 104 can be bootstrapped, using the root of trust logic 104c. In different embodiments, the integrated circuit 104 can be the root of trust which can perform authentication and attestation functionalities similar to a trusted platform module (TPM). As discussed with reference to FIG. 2, the root of trust logic 104 may perform a secure boot or a measured boot to bootstrap various components of the integrated circuit 104. In some embodiments, the root of trust logic 104c may first measure the BIOS or the boot code stored in the on-chip memory 104b before measuring other components. Thus, the use of the on-chip mechanism to bootstrap the integrated circuit 104 without relying on external devices or interfaces can minimize the exposure of sensitive information to undesirable snooping mechanisms.

In step 304, the integrated circuit 104 can determine a symmetric cryptography key for encryption and decryption of data. For example, as discussed with reference to FIG. 2, the cryptographic logic 104d can generate a symmetric cryptographic key at power up that can be stored in a register or in the on-chip memory 104b. In some embodiments, the symmetric cryptographic key can be generated using a symmetric key algorithm, e.g., AES. The symmetric cryptographic key or a transformation of the symmetric cryptographic key may be used for both encryption and decryption of the data.

In step 306, the integrated circuit 104 can encrypt the data to be written to a data storage device using the symmetric cryptographic key. For example, as discussed with reference to FIG. 2, the encryption logic 104g can encrypt the data to be written to the data storage device 202, using the cryptographic key. In some implementations, the encryption logic 104g can perform block encryption for encrypting the data. For example, the encryption logic 104g can encrypt blocks of 64 bytes at a time to generate the encrypted data.

In step 308, the integrated circuit 104 can scramble the address, using a scrambling function, corresponding to the data to be written to the data storage device 202. For example, as discussed with reference to FIG. 2, the scrambling logic 104f can scramble the address for the data to be written to the data storage device 202 using a random seed. As an example, the scrambling function may include one-to-one mapping of the address bits using the random seed. In some embodiments, the random seed may be selected at the boot time and may be stored in the on-chip memory 104b.

In step 310, the integrated circuit 104 may communicate with the data storage device 202 via a bus for writing the encrypted data at a memory location corresponding to the scrambled address. For example, as discussed with reference to FIG. 2, the output logic 104i may communicate with the data storage device 202 via the interface 206 for writing the encrypted data to the data storage device 202 at a location corresponding to the scrambled address. Thus, the interface 206 between the integrated circuit 104 and the data storage device 202 can be secured by using the encrypted data and the scrambled address for communication.

In step 312, the data storage device 202 may receive the encrypted data and the scrambled address from the integrated circuit 104 via the interface 206. In some embodiments, the data storage device 202 may also receive control signals from the integrated circuit 104. For example, as discussed with reference to FIG. 2, based on the control signals, the control logic 202b may determine that a write operation may need to be performed at a memory address corresponding to the scrambled address.

In step 314, the data storage device 202 may store the encrypted data at a memory location corresponding to the scrambled address. For example, as discussed with reference to FIG. 2, the data storage device 202 may store the encrypted data at the memory location corresponding to the scrambled address in the memory 202a. In some implementations, the control logic 202b may determine the memory location corresponding to the scrambled address.

As discussed with reference to FIG. 3, encrypting the data and scrambling the address for communicating with a data storage device, such as a memory, can provide a secure interface with the data storage device, thus minimizing the risk of exposure of data and address to a snooping device.

Figure 4:
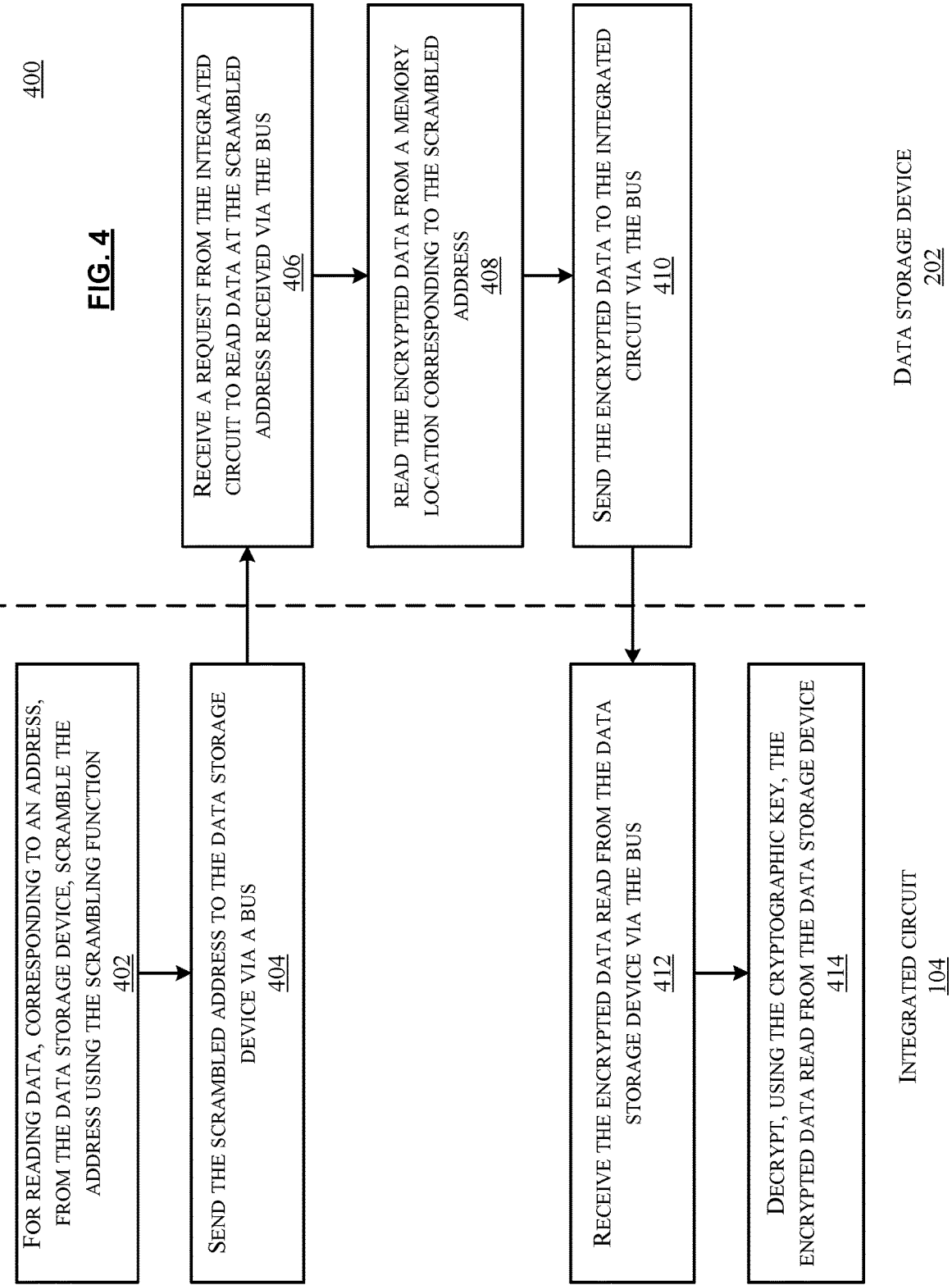
FIG. 4 illustrates communication between the integrated circuit and the data storage device, using encrypted interfaces for reading from the data storage device, in one embodiment.

FIG. 4 illustrates communication 400 between the integrated circuit 104 and the data storage device 202 using encrypted interfaces for reading from the data storage device 202, in one embodiment of the disclosed technologies. In this example, the data storage device 202 may include a volatile memory (e.g., a DRAM, an SDRAM, a DDR SDRAM, an SRAM, etc.), or a non-volatile memory (e.g., ROM, EEPROM, flash memory, etc.).

In step 402, the integrated circuit 104 can scramble an address using a scrambling function for reading data, corresponding to the address, from the data storage device 202. In one instance, the step 402 may be executed after the step 314, as discussed with reference to FIG. 3. The scrambling function used for scrambling the address for reading from the data storage device 202 may use the same random seed as used for scrambling the address for writing the encrypted data in the data storage device 202. For example, in one instance, the random seed may be the same as the random seed used in the step 308 for writing the encrypted data in the data storage device 202. In some embodiments, the random seed may be selected at the boot time and may be stored in the on-chip memory 104b. In another instance, the data storage device 202 may include a read only memory (e.g., flash, ROM) and may not use the scrambled address for a read access to the data storage device 202.

In step 404, the integrated circuit 104 may send the address to the data storage device 202 via a bus, e.g., using the interface 206 of the integrated circuit 104. In one instance, the step 404 may be executed after the step 402, e.g., when the data storage device 202 includes a volatile memory, and the data storage device 202 may have been written with the encrypted data in the step 314, as discussed with reference to FIG. 3. For example, the integrated circuit 104 may send the scrambled address to the data storage device 202 for reading encrypted data from the data storage device 202 from a location corresponding to the scrambled address. In some instances, the integrated circuit 104 may send the unscrambled address to the data storage device 202 for reading encrypted data from the data storage device 202, e.g., for read only memories.

In step 406, the data storage device 202 may receive a request from the integrated circuit 104 to read data at the scrambled address received via the bus. The address may have been scrambled using the same random seed as used for writing the encrypted data. As discussed with reference to FIG. 2, the control logic 202b may receive the read request from the integrated circuit 104.

In step 408, the data storage device 202 may read the encrypted data from a memory location corresponding to the scrambled address. As discussed with reference to FIG. 2, the encrypted data stored in the memory 202a at the memory location corresponding to the scrambled address can be retrieved. In one instance, the encrypted data may have been written in the data storage device 202, as discussed in the step 314. In another instance, the encrypted data may have been pre-loaded in the memory 202a, e.g., for read only memories. For example, the encrypted data may have been loaded at boot time or at product assembly line.

In step 410, the data storage device 202 may send the encrypted data to the integrated circuit 104 via the bus. For example, as discussed with reference to FIG. 2, the data storage device 202 may send the encrypted data to the integrated circuit 104 via the bus using the interface 206.

In step 412, the integrated circuit 104 may receive the encrypted data read from the data storage device 202 via the bus. For example, as discussed with reference to FIG. 2, the integrated circuit 104 may receive the encrypted data read from the data storage device 202 via the interface 206. Thus, using encrypted data for communicating via a bus between the data storage device 202 and the integrated circuit 104 can provide a secure interface between the devices.

In step 414, the integrated circuit 104 may decrypt, using the cryptographic key, the encrypted data sent by the data storage device 202. For example, the cryptographic key may be the symmetric cryptographic key generated by the cryptographic logic 104d, as discussed in the step 304 with reference to FIG. 3. In some implementations, the cryptographic key may be stored in the on-chip memory 104b and may be used for both encryption and decryption of the data.

Figure 5:
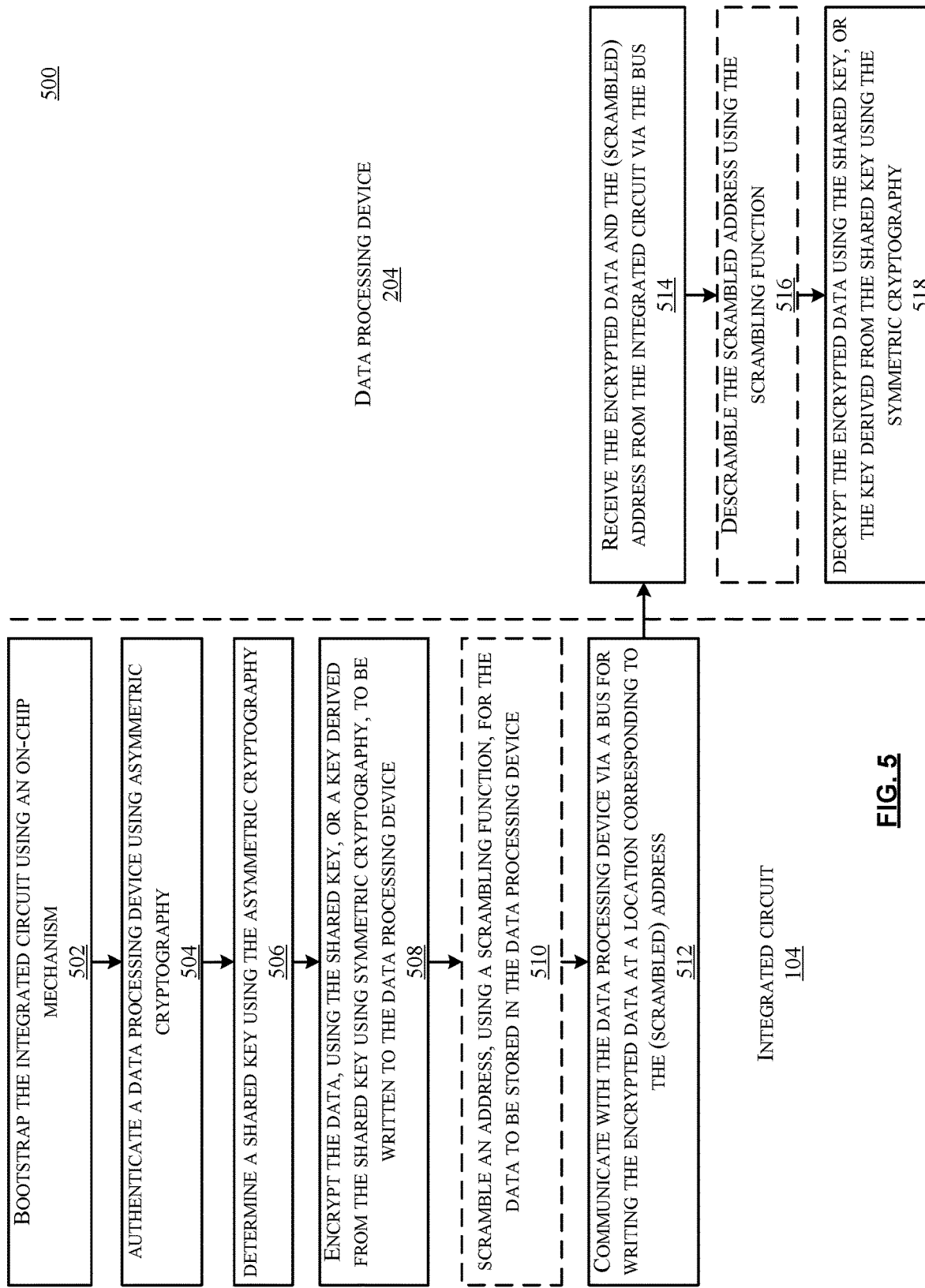
FIG. 5 illustrates communication between the integrated circuit and the data processing device for sending encrypted data to the data processing device, in one embodiment.

FIG. 5 illustrates communication 500 between the integrated circuit 104 and the data processing device 204 for writing the encrypted data to the data processing device 204, in one embodiment of the disclosed technologies. In this example, the data processing device 204 may include a device that may need to decrypt the encrypted data for further processing, e.g., a SATA drive, NIC, audio card, video card, PCI/PCIe device.

In step 502, the integrated circuit 104 can be bootstrapped using an on-chip mechanism as discussed in the step 302 with reference to FIG. 3.

In step 504, the data processing device 204 may be authenticated using asymmetric cryptography. For example, trust between the integrated circuit 104 and the data processing device 204 can be established using asymmetric cryptography before writing the encrypted data to the data processing device 204. As discussed with reference to FIG. 2, a certificate authority (CA) that may be trusted by both the integrated circuit 104 and the data processing device 204 may be used to establish a secure connection between the integrated circuit 104 and the data processing device 204. The CA may issue digital certificates that can include a public key and can certify the identity of the owner requesting the secure connection.

In step 506, the integrated circuit 104 can determine a shared key using the asymmetric cryptography. For example, as discussed with reference to FIG. 2, the cryptographic logic 104d may receive a public key from the certificate authority and may determine a shared key using the public key. The shared key may be transferred between the integrated circuit 104 and the data processing device 204 using asymmetric cryptography.

In step 508, the integrated circuit 104 can encrypt the data to be written to the data processing device 204 using the shared key or a key derived from the shared key using symmetric cryptography. For example, as discussed with reference to FIG. 2, the shared key may be used as a session key for communication between the integrated circuit 104 and the data processing device 204 using the symmetric cryptography, e.g., the AES. The encryption logic 104g can perform stream encryption or block encryption for encrypting the data.

In step 510, the integrated circuit 104 can scramble the address for the data, using a scrambling function, to be written to the data processing device 204. For example, as discussed with reference to FIG. 2, the scrambling logic 104f can scramble the address for the data to be written to the data processing device 204 using a random seed. As an example, the scrambling function may include a one-to-one mapping of the address bits using the random seed. In some embodiments, the random seed may be selected at the boot time and may be stored in the on-chip memory 104b. In some embodiments, the random seed may be selected before performing the write operation. In some embodiments, the step 510 may be optional, e.g., the address may not be scrambled. As an example, certain data processing devices may not have the capability of descrambling the address. Hence, in some instances, encrypted interface may only include encrypted data.

In step 512, the integrated circuit 104 may send the encrypted data and the address to the data processing device 204 via the bus, e.g., using the interface 208. The address may or may not be scrambled based on the data processing device. As discussed with reference to FIG. 2, the output logic 104i may communicate with the data processing device 204 via the interface 208 for writing the encrypted data to the data processing device 204 at a location corresponding to the (scrambled) address. Thus, the interface 208 between the integrated circuit 104 and the data processing device 204 can be secured using the encrypted data for communication.

In step 514, the data processing device 204 may receive the encrypted data and the address from the integrated circuit 104 via the interface 208. The address may or may not be scrambled.

In step 516, the data processing device 204 may descramble the scrambled address. For example, as discussed with reference to FIG. 2, the device address descrambling logic 204f may descramble the scrambled address using the same random seed as used by the scrambling logic 104f. In some embodiments, the step 516 may be optional based on whether the scrambled or unscrambled address was sent by the integrated device 104.

In step 518, the data processing device 204 may decrypt the encrypted data using the shared key or the key derived from the shared key using the symmetric cryptography. For example, as discussed with reference to FIG. 2, the device decryption logic 204b may decrypt the encrypted data received via the bus using the shared key. The shared key may be stored in the device memory 204d. The decrypted data may be processed by the device processing logic 204c or may be stored, in the device memory 204d, in a memory location corresponding to the address (descrambled) received from the integrated device 104.

Figure 6:
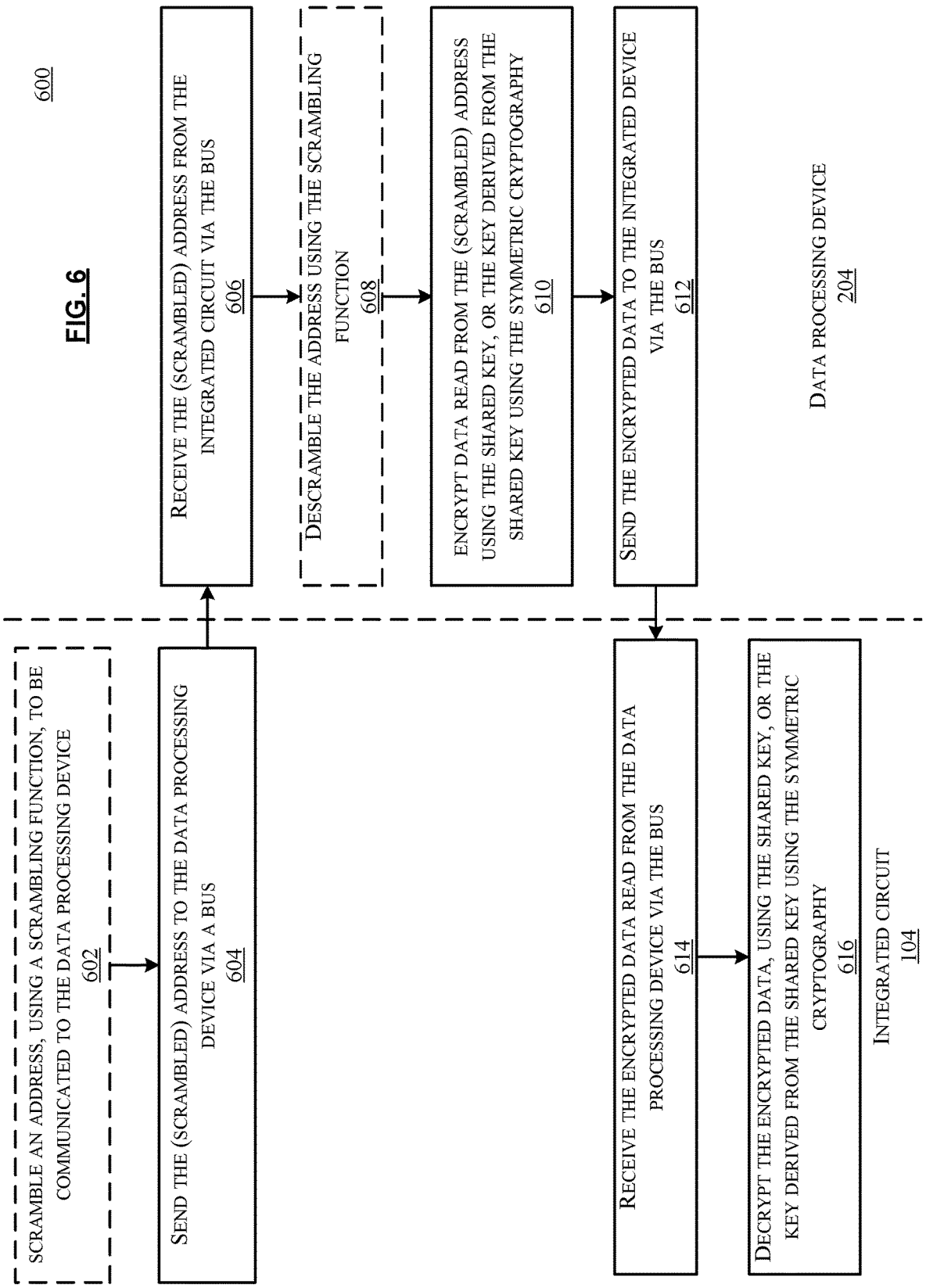
FIG. 6 illustrates communication between the integrated circuit and the data processing device for receiving encrypted data read from the data processing device, in one embodiment.

FIG. 6 illustrates communication 600 between the integrated circuit 104 and the data processing device 204 for receiving encrypted data read from the data processing device 204, in one embodiment of the disclosed technologies. In this example, the data processing device 204 may include a device that may encrypt the data for sending to the integrated circuit, e.g., a SATA drive, NIC, audio card, video card, PCI/PCIe device.

In step 602, the integrated circuit 104 can scramble an address using a scrambling function, to be communicated to the data processing device 204 over the interface 208. For example, as discussed with reference to FIG. 2, the scrambling logic 104f can scramble the address to be communicated to the data processing device 204 using the scrambling function. As an example, the scrambling function may include one-to-one mapping of the address bits using a random seed. In some embodiments, the random seed may be selected at the boot time and may be stored in the on-chip memory 104b. In some embodiments, the step 602 may be optional, e.g., the address may not be scrambled. As an example, certain data processing devices may not have the capability of descrambling the address. Hence, in some instances, an encrypted interface may only include encrypted data.

In step 604, the integrated circuit 104 can send the address to the data processing device 204 via a bus. For example, the integrated circuit 104 can send the address that may or may not be scrambled based on the data processing device 204 via the bus using the interface 208.

In step 606, the data processing device 204 may receive the address from the integrated circuit 104 via the bus using the interface 208. The address may or may not be scrambled.

In step 608, the data processing device 204 may descramble the address if the address sent by the integrated circuit 104 was scrambled. For example, as discussed with reference to FIG. 2, the device address descrambling logic 204f may descramble the address using the same random seed as used by the scrambling logic 104f.

In step 610, the data processing device 204 can encrypt the data read from the integrated circuit 104 using the shared key or a key derived from the shared key using symmetric cryptography. For example, as discussed with reference to FIG. 2, the shared key may be used as a session key for communication between the integrated circuit 104 and the data processing device 204 using the symmetric cryptography, e.g., the AES. It will be understood that the key used for encryption by the data processing device 204 in the step 610 may be different than the key used for encryption by the integrated circuit 104 in the step 508. In some embodiments, the step 610 may be executed after the step 506, as discussed with reference to FIG. 5. For example, in some instances, the data processing device 204 may initiate communication with the integrated circuit 104 without receiving the address.

In step 612, the data processing device 204 can send the encrypted data to the integrated device 104 via the bus using the interface 208.

In step 614, the integrated circuit 104 can receive the encrypted data read from the data processing device 204 via the bus.

In step 616, the integrated circuit 104 may decrypt the encrypted data, using the shared key or the key derived from the shared key using the symmetric cryptography. For example, as discussed with reference to FIG. 2, the decryption logic 104h may decrypt the encrypted data received over the interface 208 using the shared key. The shared key may be stored in the on-chip memory 104b. The decrypted data may be processed by the processing logic 104a or may be stored, in the on-chip memory 104b.

Snooping inside the integrated circuit which can have geometries in the order of nanometers can be more complex than snooping on the PCB. Thus encrypting the information going in and out of the integrated circuit and making the integrated circuit the root of trust can make it harder for the snooping devices to alter or extract sensitive data being communicated.

Figure 7:
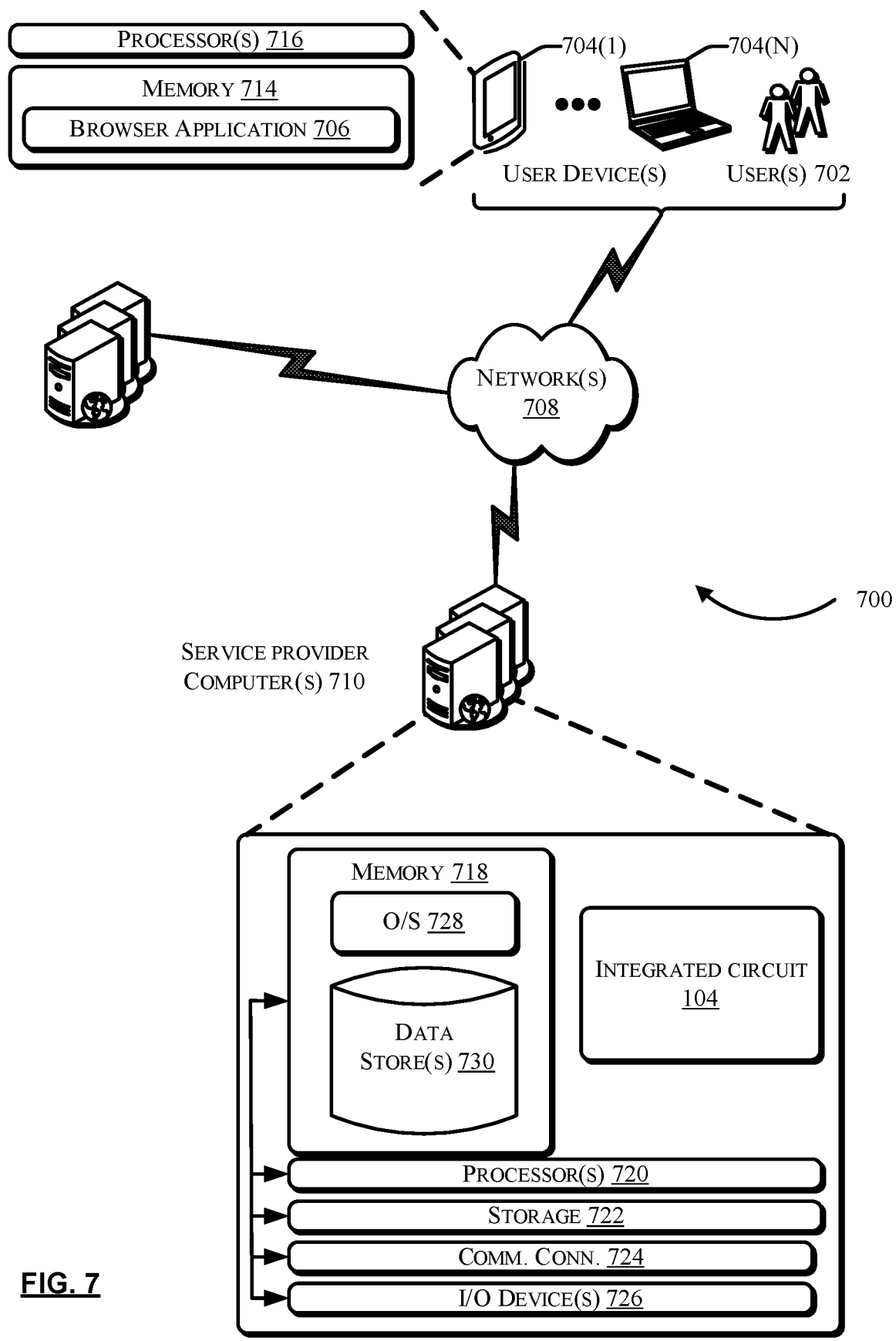
FIG. 7 illustrates an exemplary architecture for features and systems described herein that includes one or more service provider computers and/or a user device connected via one or more networks, according to at least one exemplary embodiment.

FIG. 7 illustrates an exemplary architecture for features and systems described herein that includes one or more service provider computers and/or a user device connected via one or more networks, according to at least one exemplary embodiment. The devices discussed in FIGS. 1-2 may use one or more components of the computing devices described in FIG. 7 or may be used in one or more computing devices described in FIG. 7. In architecture 700, one or more users 702 may utilize user computing devices 704(1)-(N) (collectively, user devices 704) to access application 706 (e.g., a web browser or mobile device application), via one or more networks 708. In some aspects, application 706 may be hosted, managed and/or provided by a computing resources service or service provider. One or more service provider computers 710 may provide a native application which is configured to run on user devices 704 which user(s) 702 may interact with. Service provider computer(s) 710 may, in some examples, provide computing resources such as, but not limited to, client entities, low latency data storage, durable data storage, data access, management, virtualization, cloud-based software solutions, electronic content performance management, etc. Service provider computer(s) 710 may also be operable to provide web hosting, computer application development and/or implementation platforms, combinations of the foregoing or the like to user(s) 702. Service provider computer(s) 710, in some examples, may communicate with one or more third party computers 712.

In some examples, network(s) 708 may include any one or a combination of many different types of networks, such as cable networks, the Internet, wireless networks, cellular networks and other private and/or public networks. While the illustrated example represents user(s) 702 accessing application 706 over network(s) 708, the described techniques may equally apply in instances where user(s) 702 interact with service provider computer(s) 710 via user device(s) 704 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 706 may allow user(s) 702 to interact with service provider computer(s) 710 such as to access web content (e.g., web pages, music, video, etc.). Service provider computer(s) 710, perhaps arranged in a cluster of servers or as a server farm, may host application 706 and/or cloud-based software services. Other server architectures may also be used to host application 706. Application 706 may be capable of handling requests from many users 702 and serving, in response, various item web pages. Application 706 can provide any type of website that supports user interaction, including social networking sites, online retailers, informational sites, blog sites, search engine sites, news and entertainment sites and so forth. As discussed above, the described techniques can similarly be implemented outside of application 706, such as with other applications running on user device(s) 1404.

User device(s) 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 704 may be in communication with service provider computer(s) 710 via network(s) 708, or via other network connections. Additionally, user device(s) 704 may be part of the distributed system managed by, controlled by or otherwise part of service provider computer(s) 710 (e.g., a console device integrated with service provider computers 710).

In one illustrative configuration, user device(s) 704 may include at least one memory 714 and one or more processing units (or processor(s)) 716. Processor(s) 716 may be implemented as appropriate in hardware, computer-executable instructions, firmware, or combinations thereof. Computer-executable instruction or firmware implementations of processor(s) 716 may include computer-executable or machine-executable instructions written in any suitable programming language to perform the various functions described. User device(s) 704 may also include geo-location devices (e.g., a global positioning system (GPS) device or the like) for providing and/or recording geographic location information associated with user device(s) 704.

Memory 714 may store program instructions that are loadable and executable on processor(s) 716, as well as data generated during the execution of these programs. Depending on the configuration and type of user device(s) 704, memory 714 may be volatile (such as random access memory (RAM)) and/or non-volatile (such as read-only memory (ROM), flash memory, etc.). User device(s) 704 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 714 may include multiple different types of memory, such as static random access memory (SRAM), dynamic random access memory (DRAM), or ROM.

Turning to the contents of memory 714 in more detail, memory 714 may include an operating system and one or more application programs or services for implementing the features disclosed herein including at least a user provided input element or electronic service web page, such as via browser application 706 or dedicated applications (e.g., smart phone applications, tablet applications, etc.). Browser application 706 may be configured to receive, store and/or display a website or other interface for interacting with service provider computer(s) 710. Additionally, memory 714 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 704.

In some aspects, service provider computer(s) 710 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 710 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 710 may be in communication with user device(s) 704 and/or other service providers via network(s) 708, or via other network connections. Service provider computer(s) 710 may include one or more servers, perhaps arranged in a cluster, as a server farm, or as individual servers not associated with one another. These servers may be configured to implement the keyword classification and rating feature services described herein as part of an integrated, distributed computing environment.

The service provider computer(s) 710 may include the PCB 102 as discussed with reference to FIG. 1. For example, some of the components of the service provider computer(s) 710, as shown in FIG. 7, may be on the PCB 102. In one illustrative configuration, service provider computer(s) 710 may include at least one memory 718 and one or more processing units (or processor(s)) 720. For example, the service provider computer(s) 710 may include the integrated circuit 104 as discussed with reference to FIG. 2. In some implementations, the processor 720 may be part of the integrated circuit 104. Processor(s) 720 may be implemented as appropriate in hardware, computer-executable instructions, firmware or combinations thereof. Computer-executable instruction or firmware implementations of processor(s) 720 may include computer-executable or machine-executable instructions written in any suitable programming language to perform the various functions described.

In some instances, hardware processor(s) 720 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 718 may store program instructions that are loadable and executable on processor(s) 720, as well as data generated during the execution of these programs. Depending on the configuration and type of service provider computer(s) 710, memory 718 may be volatile (such as RAM) and/or non-volatile (such as ROM, flash memory, etc.). Service provider computer(s) 710 or servers may also include additional storage 722, which may include removable storage and/or non-removable storage. The additional storage 722 may include, but is not limited to, magnetic storage, optical disks and/or tape storage. 204F The disk drives and their associated computer-readable media may provide non-volatile storage of computer-readable instructions, data structures, program modules and other data for the computing devices. In some implementations, memory 718 may include multiple different types of memory, such as SRAM, DRAM, or ROM.

Memory 718, the additional storage 722, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. Memory 718 and the additional storage 722 are all examples of computer storage media. Additional types of computer storage media that may be present in service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 710. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 710 may also contain communications connection(s) 724 that allow service provider computer(s) 710 to communicate with a stored database, another computing device or server, user terminals and/or other devices on network(s) 708. Service provider computer(s) 710 may also include I/O device(s) 726, such as a keyboard, a mouse, a pen, a voice input device, a touch input device, a display, speakers, a printer and the like.

Memory 718 may include an operating system 728, one or more data stores 730 and/or one or more application programs or services for implementing the features disclosed herein. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

Figure 8:
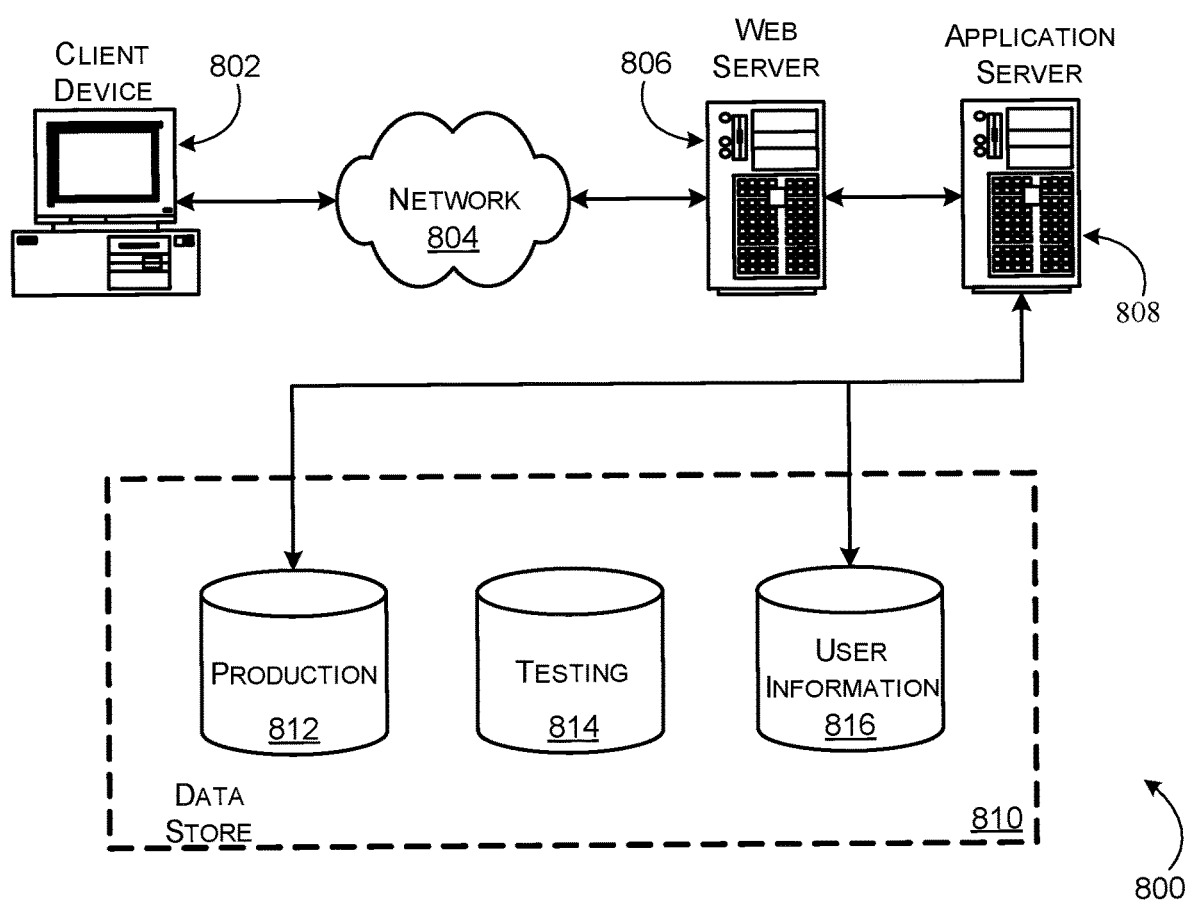
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk®. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those various embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   performing, by an integrated circuit, secure boot from a boot memory, wherein the boot memory and the integrated circuit are on a printed circuit board (PCB);
   authenticating a device using asymmetric cryptography;
   using a shared cryptographic key, encrypting data to be written to the device coupled to the integrated circuit, using symmetric cryptography;
   in response to using the shared cryptographic key to encrypt the data to be written to the device coupled to the integrated circuit using symmetric cryptography, scrambling, using a scrambling function, an address corresponding to a location in the device where the encrypted data is to be written, wherein the scrambling function is configured to perform a one-to-one mapping using a random seed, and wherein lower address bits of the address and lower address bits of the scrambled address are the same; and
   sending the encrypted data and the scrambled address to the device via a bus for writing the encrypted data at the location corresponding to the scrambled address.

2. The method of claim 1, wherein the device is configured to store the encrypted data.

3. The method of claim 1, wherein the device is configured to decrypt the encrypted data using the cryptographic key.

4. The method of claim 1 wherein the integrated circuit is a first integrated circuit mounted on the PCB in a first socket and the device is a second integrated circuit mounted on the PCB in a second socket, wherein the first integrated circuit includes a first processor and the second integrated circuit includes a second processor, and wherein the first processor and the second processor communicate using a point-to-point processor interconnect.

5. The method of claim 1, further comprising:
   establishing a trust between the integrated circuit and the device using asymmetric cryptography;
   determining the random seed at a time of establishing the trust; and
   storing the random seed in the device.

6. An integrated circuit comprising:
   processing logic configured to provide data, and an address for the data, to be communicated, via a bus, to a device coupled to the integrated circuit;
   cryptographic logic configured to authenticate the device using asymmetric cryptography;
   encryption logic configured to encrypt the data using a shared cryptographic key or a key derived from the shared cryptographic key, using symmetric cryptography;
   scrambling logic configured to, in response to using the shared cryptographic key or the key derived from the shared cryptographic key to encrypt the data using symmetric cryptography, modify the address using a scrambling function, wherein lower address bits of the address and lower address bits of the modified address are the same; and
   output logic configured to communicate with the device via the bus for writing the encrypted data at a location corresponding to the modified address.

7. The integrated circuit of claim 6, further comprising:
   input logic configured to receive the encrypted data read from the device via the bus, wherein the encrypted data was stored in the device at the location corresponding to the modified address; and
   decryption logic configured to decrypt the received encrypted data, using the cryptographic key or the key derived from the cryptographic key, for processing by the processing logic.

8. The integrated circuit of claim 6, wherein the bus includes a memory address bus configured to carry the encrypted data and the modified address, wherein the modified address corresponds to the location in the device where the encrypted data is to be written.

9. The integrated circuit of claim 6, wherein modifying the address using the scrambling function includes scrambling the address using a one-to-one mapping between each of a set of addresses for addressing the device and its corresponding scrambled address.

10. The integrated circuit of claim 9, wherein the one-to-one mapping is performed using a random seed, and wherein the random seed is selected before a first write or read of the device.

11. The integrated circuit of claim 10, wherein the scrambling function, random seed, and the cryptographic key are valid for life of the data.

12. The integrated circuit of claim 10, further comprising cryptographic logic configured to:
   establish a trust with the device;
   determine the random seed at a time of establishing the trust with the device; and
   store the random seed in the device.

13. The integrated circuit of claim 12, wherein establishing the trust with the device comprises:
   determining the shared key for communication between the integrated circuit and the device using symmetric cryptography.

14. The integrated circuit of claim 6, wherein the device is a memory device configured to store the encrypted data.

15. The integrated circuit of claim 6, wherein the integrated circuit serves as root of trust.

16. The integrated circuit of claim 6, wherein the key derived from the cryptographic key is derived using the address.

17. The integrated circuit of claim 6, wherein the integrated circuit and the device are part of a same computer system.

18. The integrated circuit of claim 6, wherein the processing logic includes a general purpose processor.

19. The integrated circuit of claim 6, wherein the lower address bits include bit [0] and bit [1].

20. An integrated circuit comprising:
   processing logic configured to provide encrypted data, and a modified address corresponding to an address for the encrypted data, to be communicated, via a bus, to a device coupled to the integrated circuit, wherein lower address bits of the address and lower address bits of the modified address are the same;
   cryptographic logic configured to:
      authenticate the device using asymmetric cryptography; and
      determine a shared key, using the asymmetric cryptography, for communication between the integrated circuit and the device;
   encryption logic configured to generate the encrypted data by encrypting data using the shared key or a key derived from the shared key, using symmetric cryptography;
   scrambling logic configured to, in response to using the shared cryptographic key or the key derived from the shared cryptographic key to encrypt the data using symmetric cryptography, modify the address using a scrambling function while maintaining the lower address bits, and output logic configured to communicate with the device via the bus for writing the encrypted data at a location corresponding to the address.

21. The integrated circuit of claim 20, wherein the encrypted data is a first encrypted data and the shared key is a first shared key, the integrated circuit further comprising:

input logic configured to receive a second encrypted data read from the device via the bus, wherein the second encrypted data was encrypted by the device using a second shared key or a key derived from the second shared key using the symmetric cryptography; and decryption logic configured to decrypt the received second encrypted data using the second shared key or the key derived from the second shared key using the symmetric cryptography.

22. The integrated circuit of claim 21, wherein the first shared key and the second shared key are rotated.

23. The integrated circuit of claim 20, further comprising: scrambling logic configured to modify the address, using a scrambling function, wherein the scrambling function uses a random seed.

24. The integrated circuit of claim 20, wherein the integrated circuit is a system-on-chip (SOC) surface-mounted on a printed circuit board (PCB).

* * * * *